INVENTORS:
Jean JARRET and
Jacques JARRET
By Abraham A. Saffitz
ATTORNEY

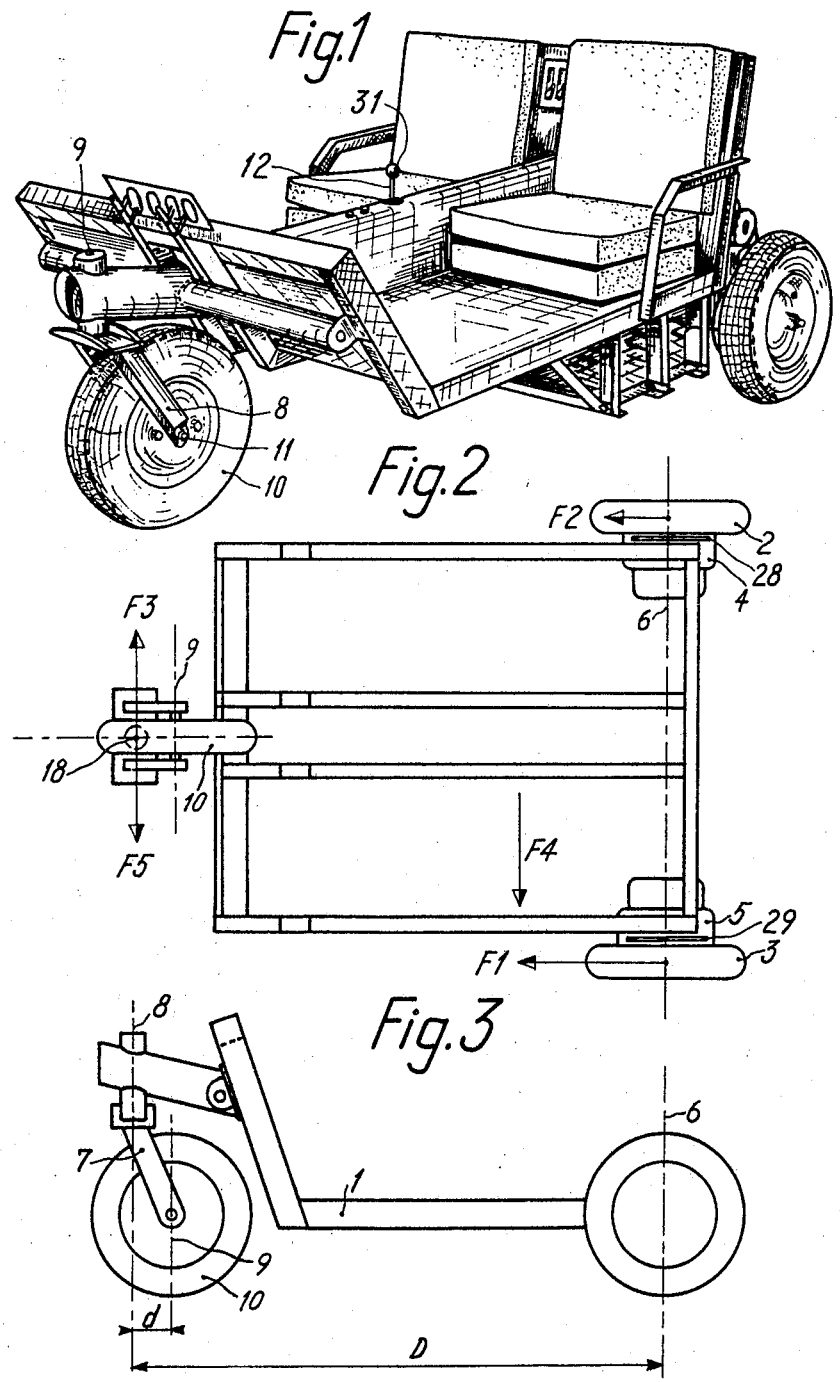

# United States Patent Office 3,481,417
Patented Dec. 2, 1969

3,481,417
DIRECTIONAL AND PROPULSIVE CONTROL DEVICE FOR AN ELECTRICAL VEHICLE
Jean Jarret, Fourqueux, and Jacques Jarret, Le Vesinet, France, assignors to Société Anonyme Elpalux, a body corporate of The Grand Duchy of Luxembourg
Filed Mar. 21, 1968, Ser. No. 714,922
Cliams priority, application France, Mar. 22, 1967, 99,811; Apr. 7, 1967, 101,934
Int. Cl. B62d *11/00;* B60k *27/00*
U.S. Cl. 180—6.5         5 Claims

ABSTRACT OF THE DISCLOSURE

A steering and propulsive unicontrol device for an electrical vehicle with one castoring and pivoting front wheel and two rear drive wheels consisting of a joy stick control, two electromechanical transducers translating the position of said stick into electrical signals, a direct current source, two intensity variation units controlled by the said electrical signals for varying the intensity of the current supplied by the direct current source, two motors respectively coupled to the two rear wheels, and means for feeding said motors from said intensity variation units.

---

This invention concerns vehicles with electrical propulsion with one castoring front wheel mounted on a freely rotating fork and two rear drive wheels without a steering wheel. More specifically, the invention concerns a steering, acceleration and braking unicontrol for the vehicle.

It is known that steering of a vehicle of the type under consideration can be assured by delivering different torques to the rear drive wheels the adjustable difference of which expresses the direction to be given to the vehicle.

This invention concerns means of controlling a vehicle both where steering, acceleration and braking are concerned, by means of a control stick mounted on a ball joint.

It has already been proposed to control the steering and speed of a vehicle by means of a single control consisting of a lever mounted for universal swinging movement by a ball joint with two rectangular axes. Rotation of the lever around one of the axes controls acceleration and braking and rotation of this first axis around the second controls a change of direction to the left and a change of direction to the right. In other words, the steering and acceleration controls of the vehicle, being orthogonal, are totally uncoupled and, for a given position of the lever making a certain angle with vertical, the component of this angle in the longitudinal vertical plane of the vehicle expresses the acceleration and the component of this same angle in the vertical transversal plane expresses the direction of the vehicle.

The vehicles with castoring front wheels and independent rear drive wheels, have the advantage of being capable of turning along a circle with one of the rear wheels as a center but on condition of being capable of blocking this rear wheel.

The object of the invention is to provide a single steering and propulsive control device for a vehicle enabling, by means of a joy stick control, on the spot turning of the vehicle.

The control system covered by the invention includes two transducers translating the angular position of the control lever into electrical signals, two rear wheel electric drive motors, a direct current source and two gradual controls respectively making the amplitudes of the power supply currents to the motors vary as a function of the signals delivered by the transducers.

In conformity with another characteristic of the invention, the transducers are equipped with a moving member in association with a fixed member (such as the slider and the coil of a potentiometer) and moving along a straight line on this fixed member, termed the maximum variation direction, and these directions are perpendicular to each other for the two transducers. A point on the control lever is linked to the moving member of the transducers by means of two rods respectively parallel to the maximum directions of variation and, therefore, perpendicular to each other. The result of this is that, when the lever is pulled in the vertical plane containing the direction of maximum variation of a transducer, it makes the corresponding transducer vary but remains without effect on the other transducer.

Other features and advantages of the invention will appear in the detailed description to follow with reference to the attached drawings, on which:

FIG. 1 illustrates an electrical trolley with one castoring front wheel and two independent rear drive wheels on which the steering and propulsive control device, in accordance with the invention, is mounted;

FIGS. 2 and 3 illustrate the horizontal projection from beneath and the vertical projection of the trolley on FIG. 1;

Figure 4:
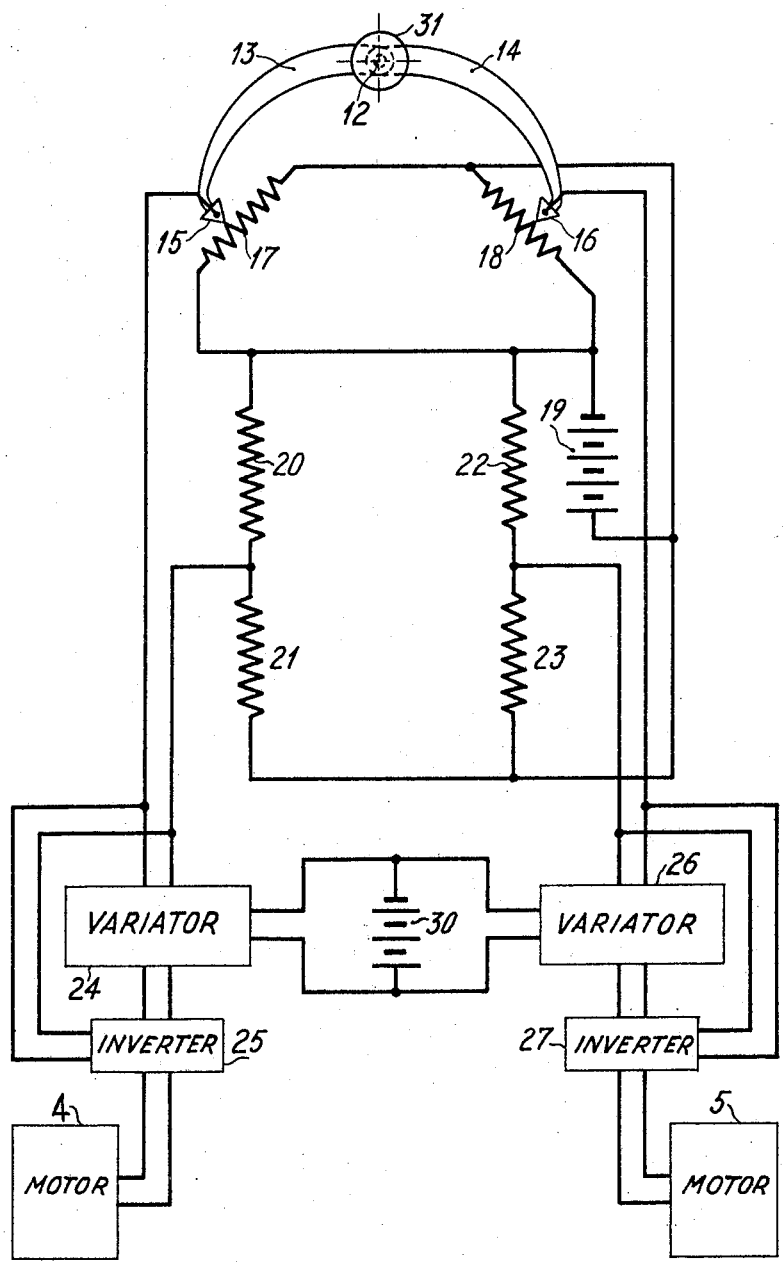
FIG. 4 illustrates a control device in which the transducers are potentiometers.

FIG. 1 illustrates a vehicle in conformity with the invention and FIGS. 2 and 3, respectively, illustrate the chassis of this vehicle shown in horizontal and vertical projections. The chassis consists of spars 1 which support rear wheels 2 and 3 rotating around axes 6 and 7, and are driven or braked by electric motors 4 and 5. On the front, a support or pivoting fork 8, castors freely around a substantially vertical axis 9 and carries front wheel 10.

If the driver of the vehicle delivers, through motor 5, a torque greater than that delivered by motor 4, the force $F_1$ applied to the chassis by wheel 3 is greater than the force $F_2$ applied to the chassis by wheel 2. This results, on vertical axis 9, in a transversal thrust $F_3$ which rotates pivoting support 8 and brings axis 11 of the front wheel to make an angle with axes 6 and 7 of the rear wheels. The trajectory of the vehicle then describes a curve and, for this reason, is subjected to centrifugal acceleration which creates, at center of gravity G of the vehicle located between the front and rear wheels, a transversal force $F_4$ in which a component $F_5$ applied to vertical axis 9 of pivoting support 8, tends to balance force $F_3$ resulting from the differences in drive torque.

It is advisable to select the distance $d$ between vertical axis 9 of the pivoting support and axis 11 of the front wheel so that it ranges between 1% and 25% of the distance D between the vertical axis 9 and axes 6 and 7 of the rear wheels, so as to make it possible to maintain the vehicle stable on its trajectory.

A control lever 12 is illustrated on FIG. 1 which serves both for vehicle steering and speed control.

By referring now to FIG. 4, the joy stick control comprising a control lever of the vehicle may be seen at reference 12. The end of the lever is articulated on two linkages 13 and 14 which carry sliders 15 and 16 of two potentiometers 17 and 18 on their extremities. The arrangement is such that, when the top of the lever is pushed towards the front of the vehicle the sliders advance towards the extremities of the potentiometers connected to the positive pole of battery 19 and that, when the top of the lever is pushed backwards, they advance towards the extremities of the potentiometers connected to the negative pole of this battery. When the lever is pushed towards the left or towards the right, the sliders move in opposite directions on the potentiometers. Resistors 20–23 shunt battery 19 and the output signals of the potentiometers are taken between the sliders and the junction points of resistors 20 and 21 in the case of slider 15 and resistors 22 and 23 in the case of slider 16. The result is that the output signals from the potentiometers are plus or minus according to whether the potentiometer slider is on one or the other side of a central point of the potentiometer coil.

The potentiometer output signals are applied, respectively, firstly to a gradual control system 24 and to an inverter 25 and, secondly, to a gradual control system 26 and an inverter 27.

The power supply battery 30 of the vehicle supplies motors 4 and 5 through the gradual control units and the inverters. The function of the gradual control unit is to produce a variable output current from a constant input current, the amplitude of the output current being a linear function of the input signal. Such devices are known within the technique in several versions. They can, for example, consist of a gate which passes or breaks the power supply current and which is controlled by a pulse generator in which the control signal makes the frequency vary. Thus, assuming that the current passes through the gate during the duration of pulses and breaks during the periods between pulses, the amplitude of the output current increases with the frequency of pulses.

Each gradual control unit is followed by an inverter which can, for example, be a polarized relay and designed to invert the direction of the power supply current of the motor so as to reverse the rotational direction.

Motors 4 and 5 can be advantageously variable reluctance motors with variable speed described in U.S. patent application Ser. No. 550,440, filed May 16, 1966, now U.S. Patent 3,435,266 issued Mar. 25, 1969 in the names of the present applicants.

On FIG. 4, the electromechanical transducers translating the position of the lever into an electrical signal are potentiometers. Other types of electromechanical transducers can be used, for example:

Blanking caps assuring variable illumination of photoelectric cells;

Magnetic-resistors placed in a variable magnetic resistance circuit;

Mutual induction detectors.

Figure 5:
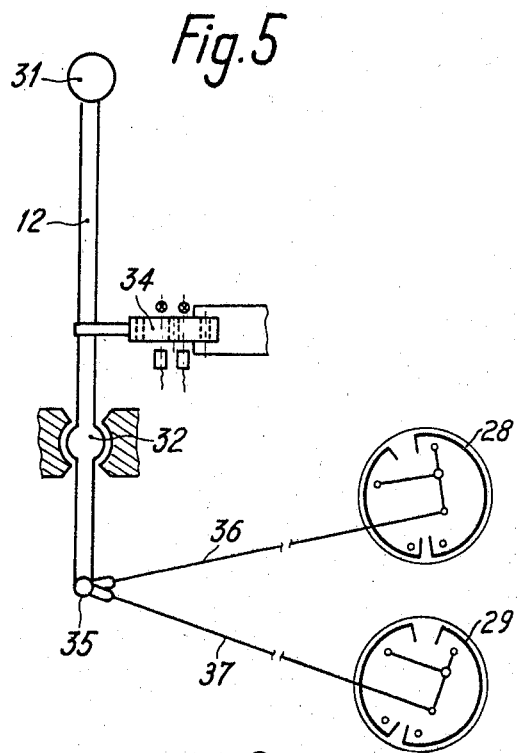
FIGS. 5 and 6 illustrate a control device in which the transducers are progressive photoelectric barriers.

Referring now to FIG. 5, lever 12 can again be seen which carries, on its upper extremity, a handle 31 on which the driver's hand rests. Lever 12 can, when actuated by the driver, slope in all directions around a ball joint 32. The lever rod moves the mechanical part of a detector 34 which actuates the gradual control units of the electric motors in such a manner that, by pushing the lever forward, the vehicle is accelerated, by pushing the lever backward, the vehicle is braked or placed in reverse, by pushing the lever to the left, the right hand drive wheel is accelerated whereas the left hand drive wheel is braked or placed in reverse, finally, when pushing the lever to the right, the left hand drive wheel is accelerated while the right hand drive wheel is braked or placed in reverse.

On the lower extremity 35 of lever 12 are attached two cables 36 and 37 which are respectively linked to brakes 28 and 29 of the left and right hand wheels. If the lever is stongly pulled backwards, which corresponds to parking position, cables 36 and 37 are stretched and brakes 28 and 29 enter into action with the braking being stronger to the left or to the right according to whether the lever is sloped towards the left or towards the right.

Figure 6:
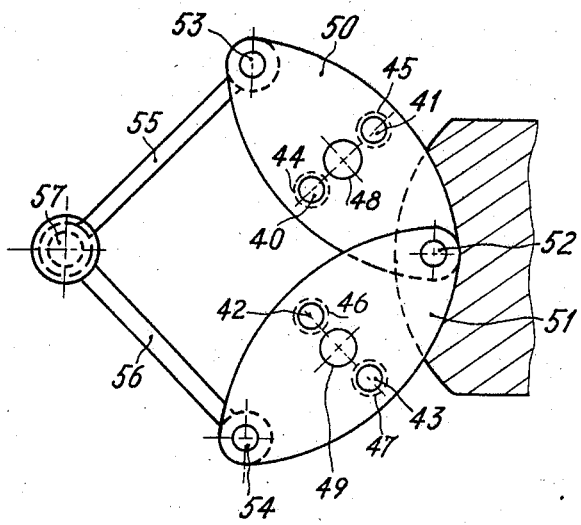

FIG. 6 gives a diagrammatic illustration of the position detector 34 of the lever. This detector includes four transducers consisting of four stationary photodiodes 40 and 41, 42 and 43, in which illumination is assured by four luminous sources 44, 45, 46, 47 also stationary. The radiation from the luminous sources can reach the photodiodes through two windows 48 and 49 in two cover plates 50 and 51. Each cover plate is mounted, at one of its extremities, on a single fixed pin 52. The two other extremities of the covers are attached, by two pivot points 53 and 54, to two arms 55 and 56, the entire unit forming an articulated parallelogram. These two arms 55 and 56 are linked to control lever 12 by a common spherical articulation 57. When a window is placed between the light source and the corresponding photodiode, the motor torque takes its maximum value; and this torque decreases progressively as the window moves and the cover opposes the passage of light rays. The torque variations thus obtained are extremely progressive and smooth and enable the driver to accurately and without the use of bodily force, manoeuver the vehicle along a selected trajectory.

As has been stated in the beginning, the single ball joint control lever must deliver signals which enable the drive of two drive wheels at different speeds and, in particular, the blockage of one of these wheels whilst the other is driven. This result is possible with the steering and propulsive control system covered by the invention as a result of a suitable layout consisting of two transducers relative to the two drive wheels. A maximum variation in direction can be defined in each transducer, thta is to say a direction along which passage of the maximum control signal of one sign to the maximum control signal of the opposite sign, takes place along the shortest route. In the case where the transducers are straight coil potentiometers, this direction is that of the axis of the coil. In the case where the transducers are photoelectric barriers as shown in FIG. 6, this direction is the direction joining photo-electric cells 40–41 or 42–43.

In the invention, the directions of maximum variation of control signals relative to the two wheels are substantially perpendicular to each other so that, when the lever is moved along one of the directions of maximum variation of a transducer from neutral position to make the speed of a drive wheel vary up to maximum, the other transducer is not to be actuated. It can be seen, for example, that if, on FIG. 6, handle 31 is moved along the extension of linkage 56, window 49 comes opposite the alignment joining bulb 47 to the photo-electric cell 43, whereas the cover plate 50 the operational linkage 55 of which is perpendicular to the direction of movement of the lever, hardly moves at all. The same is the case on FIG. 4 where it can be seen that, if the lever is pulled upwards in a direction parallel to that of the coil of potentiometer 18, slider 16 of this potentiometer is moved whereas slider 15 of potentiometer 17 is not.

In actual fact, it is not absolutely necessary that the directions of maximum variation be strictly rectangular and an angle of 60° to 120° can be allowed between them. This means that, relative to the longitudinal direction of the vehicle, the maximum directions of variation must slope, relative to this longitudinal direction, by an angle ranging between 30° and 60°.

What we claim is:

1. A steering and propulsive unitary control device for an electrical vehicle with one castoring and pivoting front wheel and two rear drive wheels, said device consisting of a control stick mounted for universal swinging movement by a ball joint, two electromechanical transducers translating the position of said stick into electrical signals, a direct current source, two intensity variation units controlled by said electrical signals for varying the intensity of the current supplied by said direct current source, two motors respectively coupled to said two rear wheels, and means for feeding said motors from said intensity variation units, in which said electromechanical transducers each include a moving member, a fixed straight member with the movement of the moving member taking place along said fixed straight member for producing a variable electrical signal, the fixed straight members of the transducers being approximately perpendicular to each other, and two links respectively parallel to said fixed members connecting said moving members to said control stick, whereby when said control stick is moved in the direction of one of said members, it drives one of said moving members parallel to said latter fixed member and leaves the other moving member stationary.

2. A steering and propulsive unitary control device according to claim 1 in which said electromechanical transducers are potentiometers and include a moving slider and a fixed straight coil, the coils of the potentiometers being approximately perpendicular to each other, and two links respectively parallel to said coils and connecting said sliders to said control stick.

3. A steering and propulsive unitary control device according to claim 1 in which said electromechanical transducers are photoelectric transducers and include two photoelectric barriers formed by a light source and a photoelectric cell associated therewith, an elongated pivotally mounted cover plate provided with a hole, said plate being pivoted to a common pivot in such a manner that said hole be capable of passing through the space between said two photoelectric barriers, the two cover plates being approximately perpendicular to each other when said control stick is in a neutral position, and two links respectively parallel to said elongated cover plates and pivoted to said stick connecting said plates to said control stick.

4. A steering and propulsive unitary control device for an electrical vehicle as claimed in claim 1, further comprising two brakes respectively coupled to said two rear wheels and two cables connecting the lower end of said stick to said brakes.

5. A steering and propulsive unitary control device for an electrical vehicle with one castoring and pivoting front wheel and two rear drive wheels, said device consisting of a control stick mounted for universal swinging movement by a ball joint, two electromechanical transducers translating the position of said stick into electrical signals, a direct current source, two motors respectively coupled to said two rear wheels, and means for feeding said motors from said direct current source, in which said electromechanical transducers each include a moving member, a fixed straight member with the movement of the moving member taking place along said fixed straight member for producing a change of the current intensity supplied by said direct current source, the fixed straight members of the transducers being approximately perpendicular to each other, and two links respectively parallel to said fixed members connecting said moving members to said control stick, whereby when said control stick is moved in the direction of one of said members, it drives one of said moving members parallel to said latter fixed member and leaves the other moving member stationary.

References Cited

UNITED STATES PATENTS

| | | | |
|---|---|---|---|
| 2,565,293 | 8/1951 | Aydelott et al. | 180—6.5 X |
| 2,586,273 | 2/1952 | Steven. | |
| 2,605,852 | 8/1952 | Rhoads | 180—6.5 X |
| 3,276,531 | 10/1966 | Hale et al. | 180—6.5 X |
| 3,323,607 | 6/1967 | Futamata | 180—77 X |

LEO FRIAGLIA, Primary Examiner

J. A. PEKAR Assistant Examiner

U.S. Cl. X.R.

180—77